(12) United States Patent
Kirschner

(10) Patent No.: US 11,475,486 B1
(45) Date of Patent: *Oct. 18, 2022

(54) COLLABORATIVE BIDDING IN SEALED ONLINE AD AUCTIONS

(71) Applicant: Amazon Technologies, Inc., Seattle, WA (US)

(72) Inventor: James Caleb Kirschner, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 3 days.

This patent is subject to a terminal disclaimer.

(21) Appl. No.: 16/847,378

(22) Filed: Apr. 13, 2020

Related U.S. Application Data

(62) Division of application No. 15/437,372, filed on Feb. 20, 2017, now Pat. No. 10,650,445, which is a division of application No. 13/664,163, filed on Oct. 30, 2012, now abandoned.

(51) Int. Cl.
*G06Q 30/00* (2012.01)
*G06Q 30/02* (2012.01)

(52) U.S. Cl.
CPC .................. *G06Q 30/0275* (2013.01)

(58) Field of Classification Search
CPC .................. G06Q 30/00; G06F 17/30
See application file for complete search history.

(56) References Cited

U.S. PATENT DOCUMENTS

| | | | | |
|---|---|---|---|---|
| 8,521,584 B1* | 8/2013 | Feng | ...................... | G06Q 30/08 705/14.1 |
| 8,589,234 B1* | 11/2013 | Lee | .................... | G06Q 30/0275 705/14.71 |
| 2002/0065769 A1* | 5/2002 | Irribarren | ............... | G06Q 40/04 705/37 |
| 2005/0097024 A1* | 5/2005 | Rainey | .................... | G06Q 30/02 705/37 |
| 2010/0332616 A1* | 12/2010 | Sinha | ...................... | G06Q 30/00 709/218 |
| 2011/0137749 A1* | 6/2011 | Kwei | .................... | G06Q 30/0623 705/26.41 |

(Continued)

OTHER PUBLICATIONS

Wilenius, Jim, "Bidding in Combinational Auctions", Digital comprehensive summaries of Uppsala dissertations from the faculty of science and technology656, dated Sep. 18, 2009. (Year: 2009).*

(Continued)

*Primary Examiner* — Mark A Fadok
(74) *Attorney, Agent, or Firm* — Eversheds Sutherland (US) LLP

(57) ABSTRACT

Certain embodiments herein relate to implementing collaborative bidding in online auctions. A determination may be made whether bidding entities, or bids associated with bidding entities, share promotional interests, such as promoting the same product. Bids submitted by bidding entities that share the same promotional interests may be combined to create a single, combined bid that may compete against other bids in an online auction. Costs associated with promoting the product may be allocated among such bidding entities in various ways, including proportional allocation of cost based on a bid price submitted by the bidding entity.

20 Claims, 6 Drawing Sheets

(56) References Cited

U.S. PATENT DOCUMENTS

| | | | |
|---|---|---|---|
| 2011/0270686 A1* | 11/2011 | Patwa | G06Q 30/0269 705/14.66 |
| 2011/0288928 A1* | 11/2011 | Patwa | G06Q 30/0256 705/14.42 |
| 2014/0058848 A1* | 2/2014 | Jian | G06Q 30/0275 705/14.71 |

OTHER PUBLICATIONS

Expedia group, "Co-Op Campaigns", advertising.expedia.com/solutions/co-op-campaigns, dated Nov. 29, 2009. (Year: 2009).*
Github, "Collaborate to Negotiate", saylordotorg.github.io, dated Apr. 20, 2010. (Year: 2010).*

* cited by examiner

COLLABORATIVE BIDDING IN SEALED ONLINE AD AUCTIONS

CROSS-REFERENCE TO RELATED APPLICATION(S)

This application is a division of U.S. Nonprovisional application Ser. No. 15/437,372 filed Feb. 20, 2017, which is a division of U.S. Nonprovisional application Ser. No. 13/664,163 filed Oct. 30, 2012, the entire disclosures of which are hereby incorporated by reference.

BACKGROUND

Various entities may compete for an opportunity to present ads on web pages or other information resources by submitting bids in an auction for such opportunities. Conventional auction systems may pit individual bids against one another to determine a winning bid. Unfortunately, such systems may not support collaboration between bidding entities that share promotional interests, such as an interest in promoting the same product. As a result, a bidding entity may miss opportunities to promote a product or interest shared with other bidding entities at a reduced cost through collaboration with certain other bidding entities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
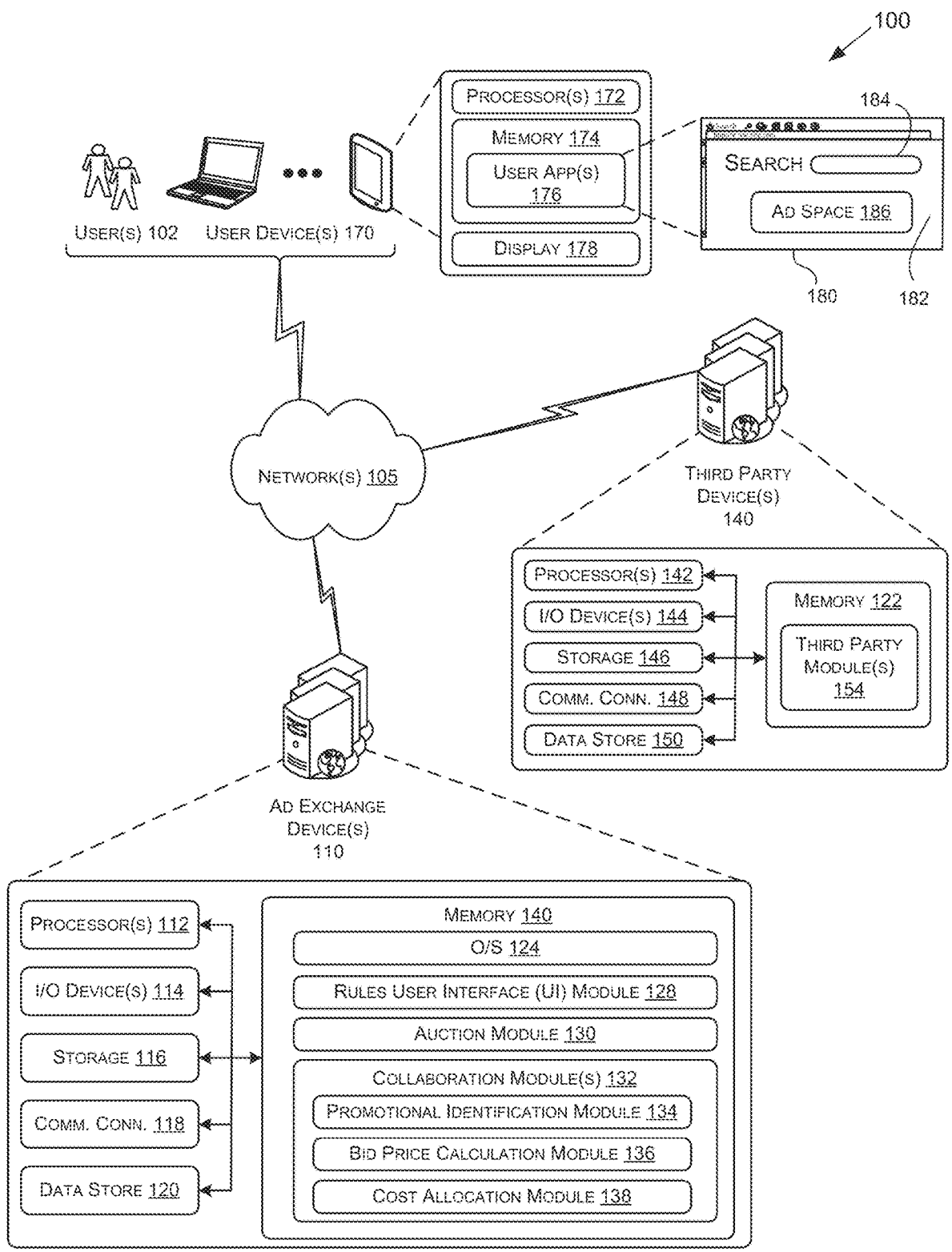
FIG. 1 illustrates an example computing environment for implementing collaborative bidding, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments herein are directed to, among other things, implementing collaborative bidding in an online auction. Collaborative bidding may refer to the process of enabling interested persons and/or entities to collaborate or work together to win an auction for ad space in which the interested persons and/or entities may display an ad. Such collaboration may be effectuated by combining respective bids from and associated with each of the interested persons and/or entities. Thus, certain embodiments herein can relate to facilitating collaboration between bidding entities that share the same promotional interest, such as by promoting the same product. Such bidding entities may submit individual bids for ad space along with other bidding entities that may not share the same promotional interest. For example, one bidding entity may be a publisher of a compact disc (CD) interested in promoting the CD, another bidding entity may be the author of the CD, and yet another bidding entity may be a seller of the CD. Other bidding entities, however, may not be interested in promoting the same CD but may instead be interested in promoting a different CD associated with a different artist or a different publisher.

Certain embodiments herein can relate to combining bids that promote the same product, service, interests, etc. (generally referred to herein as products) to make the combined bids more competitive against other competing bids in an auction. Combining bids to increase competitiveness among competing bids may include summing, averaging, etc., bid prices for any number of bids that promote the same product, or that are submitted for an opportunity to advertise the same product. For example, the summed bid prices may represent an individual bid price that may be compared to one or more competing bid prices to determine a winning bid. In any instance, costs may be allocated among bidding entities that share promotional interests (e.g., by virtue of the bidding entities submitting bids that promote the same product) using various approaches such that cost of promoting products may be shared among such bidding entities.

One use case example of combining bids that promote the same product may be as follows. The publisher, the author, and the seller of the CD mentioned above may each submit a bid of $0.60, $0.50 and $0.20, respectively, for an opportunity to display an ad promoting the CD. A competing entity, or an entity not promoting the CD, may submit a bid price of $0.80. In one embodiment, a user interested in purchasing the CD may enter (e.g., via a web browser or dedicated application) search criteria to identify the CD. A determination may be made whether bids associated with the publisher, the seller, the author, and the competing entity are relevant to the search criteria and, if so, each of the bids may be included in an auction for the opportunity to present an ad to the user. A further determination may be made whether each of the bids are promoting the same product, e.g., the CD. Because the bids associated with the publisher, the seller, and the author are each promoting the CD, according to the present example, a combined bid price of $1.20 (i.e., $0.60+$0.40+$0.20) may be included in the auction to compete against the $0.80 bid price. Thus, the combined bid price of $1.20, submitted on behalf of the publisher, the seller, and the author, may win the auction by virtue of the combined bid price of $1.20 being greater than the $0.80 bid price submitted by the competing entity.

In one embodiment, costs associated with winning the auction may be shared amongst the publisher, the seller, and the author. For example, in a second price auction, the cost charged to the winning bidder may be approximately equivalent to the bid price of the second place bidder. That is, the combined entity of the publisher, the seller, and the author may be charged a price equal to approximately the $0.80 bid price submitted by the competing entity. In one embodiment, the costs may be allocated proportionally to the bid price submitted by the purchaser, the seller, and the author. For example, because the publisher submitted a bid price of $0.60, or 50% of the combined bid price of $1.20, costs in the amount of $0.40 may be allocated to the publisher (i.e., 50% of the second place bid price of $0.80). In another embodiment, a similar determination may yield an amount of cost allocated to the seller and the author.

Thus, by enabling bidding entities to collaborate in an auction, the bidding entities may win an opportunity to promote products that they may not have won acting alone, as well as share costs associated with promoting the products.

Furthermore, certain embodiments herein may relate to a sealed bid auction, in which bidding entities may be unaware of which bids may be collaborative or promoting the same interests as the bidding entity.

In any instance, various techniques described herein may implement or facilitate the collaboration of bids in association with auctions. Bids associated with auctions may be referred to herein as multiple auction bids.

FIG. 1 depicts an example computing environment for implementing collaborative bidding, according to an embodiment of the disclosure. As shown, the example computing environment may include, but is not limited to, an ad exchange device 110, a third party device 140, and a user device 170. Although only one of each of these devices is shown, more may exist in other embodiments. Each of the devices in FIG. 1 may communicate with one another over one or more networks 105. For example, the ad exchange device 110 may receive search criteria, such as one or more keywords, from the user device 170 and may receive bids from one or more third party devices 140, which may be associated with bidding entities. The ad exchange device 110 may use such received information to determine whether bids may be combined, as will be described in greater detail below.

The one or more networks 105 may include any number of wired or wireless networks that can enable various computing devices in the example computing environment 100 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another, e.g., a third party bidder device 140 may be directly connected to the ad exchange device 110.

Certain embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, distribution of software may be downloaded via the Internet.

As used herein, "ad space" may refer generally to a location, an environment, or a placeholder that may store and/or serve ad impressions. In one example, ad space may refer to a particular location on a web page in which an ad impression may be presented for viewing and/or interaction by a user. In one embodiment, a particular location of ad space may be referred to as a "buy box," or the most prominent location on a web page or other information resource for presenting an ad.

References to the term "product" herein are not meant to exclude services or other intangible items. As a non-limiting example, certain embodiments herein refer to determining whether a bid promotes the same product. The term "product" in this sense may also include a service, concept, a combination of any number of services and/or goods, or anything that may be advertised and/or purchased by a user. Similarly, the term "product ads" as used herein is not meant to be limited to ads for products but may also include ads for services, concepts, etc.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may implement or facilitate collaborative bidding as described herein.

The devices in FIG. 1 may include one or more processors configured to communicate with one or more memory devices and various other components or devices. For example, the ad exchange device 110 may include one or more processors 112 that are configured to communicate with one or more memory or memory devices 122, one or more input/output (I/O) devices 114, storage 116, one or more communication connections 118, and one or more data stores 120. The processor 112 may be implemented as appropriate in hardware, software, firmware, or a combination thereof. The processors 142 and 172 associated with the third party device 140 and the user device 170, respectively, may be the same or at least similar to the processor 112, in one embodiment.

The memory 122 may store program instructions that are loadable and executable on the processor 112, as well as data generated during the execution of these programs. Depending on the configuration and type of ad exchange device 110, the memory 122 may be volatile, such as random access memory (RAM), and/or non-volatile, such as read-only memory (ROM), flash memory, etc. The memory 122 and 174 associated with the third party device 140 and the user device 170, respectively, may be the same or at least similar to the memory 122, in one embodiment.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 146 associated with the third party device 140 may be the same or at least similar to the storage device 116, in one embodiment. In some implementations, the memory 122 may include multiple different types of memory, such as static random access memory (SRAM), dynamic random access memory (DRAM), or ROM.

The memory 122 and the storage 116, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 118 may allow the ad exchange device 110 to communicate with other devices, such as the third party devices 140 and the user devices 170, databases, user terminals, and various other devices that may exist on the one or more networks 105. In one embodiment, the communication connections 148 associated with the third party device 140 may be the same or at least similar to the communication connections 118.

The I/O devices 114 may enable a user to interact with the ad exchange device 110 to, for example, submit keyword search terms to identify products for purchase, according to one example. Such I/O devices 114 may include, but are not limited to, a keyboard, a mouse, a pen, a voice input device, a touch input device, a display, a camera or imaging device, speakers, or a printer. The I/O devices 144 associated with the third party device 140 may be the same or at least similar to the I/O devices 114, in one embodiment.

The one or more data stores 120 may store lists, arrays, databases, flat files, etc. In some implementations, the data stores 120 may be stored in memory external to the ad exchange device 110 but may be accessible via the one or more networks 105, such as with a cloud storage service. The data stores 120 may store information that may facilitate collaborative bidding as described herein. Such information may include, but is not limited to, ads and associated data that may be used to serve ad impressions, as well as rules or other information that may facilitate the implementation of collaborative bidding as described herein. The data store 150 associated with the third party device 140 may be the same or at least similar to the data store 120, in one embodiment.

The memory 122 may also store an operating system (O/S) 124 and various software applications and/or modules that may implement or facilitate collaborative bidding. Example modules may include, but are not limited to, a rules user interface (UI) module 128, an auction module 130, and one or more collaboration modules 132. Each of these modules may be implemented as individual modules that provide specific functionality associated with implementing collaborative bidding. Alternatively, one or more of the modules may perform all or at least some of the functionality associated with the other modules.

The rules UI module 128 may provide a user interface that enables a user associated with a bidding entity, such as a third party device 140, to configure collaborative bidding parameters for bids submitted by the bidding entity. Such parameters may include certain rules or preferences that may determine whether bids may be combined with other bids (i.e., are combinable) and, if so, circumstances or conditions by which the bids may be combined, as non-limiting examples of possible rules or preferences. As an example, a user may utilize the rules UI module 128 to specify whether, or according to which circumstances, a bid associated with a bidding entity may be combined with bids associated with other bidding entities having a similar promotional interest or, for example, that promotes the same product. As another example, rules may be established via the rules UI module 128 such that a bid may only be combined with another bid promoting the same product if one of the bids promoting the same product is currently winning the most prominent location for an ad on a web page, e.g., the buy box, as described above.

As another example, a user may utilize the rules UI module 128 to specify a list of products desired to be promoted by a bid. The user may further specify certain criteria, such as a particular brand of the products and/or a price range associated with the products that, if met, may trigger the submission of a bid associated with one or more of the products. In one embodiment, the collaboration module 132 may provide the determination and submission of such bids. Additional examples may include, but are not limited to, establishing rules such that a bid may only be combined with bids associated with certain bidding entities, and permitting the combination of bids up to a predetermined threshold bid price.

The above examples of implementing rules to configure the collaboration of bids submitted by various entities are not meant to be limiting. In other examples, any number of criteria may be specified via the rules UI module 128 to enable specialized configuration of bid collaboration for a bidding entity, e.g., a third party device 140, to tailor the collaborative bidding process for a particular bidding entity or bid.

The auction module 130 may perform various functions associated with conducting an online auction to determine a winning bid. In one embodiment, such an auction may be performed by a real-time bidded (RTB) exchange, in which a winning bid may be determined within about 50 milliseconds (ms) to about 100 ms. Certain embodiments herein may be directed to a second price auction, in which the cost associated with a second place bidding entity may be used to determine cost for the winning bidding entity. Allocation of "second price" costs to the winning bidding entities will be discussed in greater detail below.

The auction module 130 may further facilitate communication with various bidding entities, such as the third party devices 140. For example, the auction module 130 may configure the ad exchange device 110 to receive bids, as well as various information accompanying bids (as will be described in greater detail below), from the third party devices 140. Various protocols may be utilized by the auction module 140 to facilitate such communication. Examples of such protocols may include, but are not limited to, Hypertext Transfer Protocol (HTTP), Transmission Control Protocol/Internet Protocol (TCP/IP), socket-based protocols such as the WebSocket protocol, or other message formats and/or rules for exchanging information between computing devices to support communication between web-based program code and client-server-based program code, as examples. In another embodiment, the auction module 130 may include one or more application programming interfaces (APIs) that may utilize such protocols, or other program code or techniques that may configure the ad exchange device 110 to communicate with the devices shown in FIG. 1.

The collaboration module 132 may perform functions that enable bids to be combined, or put another way, may perform functions that enable bidding entities to share promotional interests. In one embodiment, the collaboration module 132 may include one or more modules that may perform specific functionality associated with implementing collaborative bidding as described herein. Such modules may include, but are not limited to, a promotional identification module 134, a bid price calculation module 136, and a cost allocation module 138. In addition to these modules, which will be described in turn below, the collaboration module may perform functions to facilitate the processes described herein.

For example, the collaboration module 132 may identify information accompanying bids submitted by bidding entities, such as the third party devices 140. Such information may include a bid price, targeting preferences, and information associated with a product that the bid promotes, among other information. The bid price may indicate a price that a bidding entity is willing to pay for ad space for promoting the product associated with the bid or, put another way, for displaying an ad associated with a product in the ad space.

The targeting preferences may indicate criteria or conditions that, when met, may trigger a submission of a bid for ad space. According to certain embodiments herein, targeting preferences may include a description or one or more keywords, at least a portion of which when entered by a user searching for product ads may trigger the submission of the bid. For example, a targeting preference associated with a bid may include the description "50 Shades of Grey." When a user enters at least a portion of the term "50 Shades of Grey" (e.g., "50 Shades") into a web browser user interface, for example, a bid associated with the example targeting preference may be submitted. A more detailed description of the above example will be provided in association with FIG. 2. Target preferences that are based on criteria other than keyword searches may exist in other embodiments.

As mentioned, bid information may also include information associated with a product ("product information") that is promoted by the bid. Such information may include, but is not limited to, content associated with a product, such as an ad for a product that may be displayed on a web page or other information resource. The information may also include a description and/or identification of a product associated with the bid. Such a description may be in text format or another format that may facilitate comparison of the description to other product descriptions to determine whether a match exists between the descriptions. In one embodiment, product information may also include a hyperlink or other reference that corresponds to a Uniform Resource Locator (URL) associated with a website. According to one example, when a bid is determined to be a winning bid, an ad for a product associated with the winning bid may be retrieved via the reference.

A product may refer to an item, service, offer, any combination thereof, etc., that is sought to be promoted by a bidding entity. According to the above example in which the targeting preferences associated with a bid include the description "50 Shades of Grey," a product associated with the bid may be the book "50 Shades of Grey." Other example products may include a poster, a T-shirt, other tangible items displaying the title, author, etc., of "50 Shades of Grey." Services may also be promoted in addition to products. For example, an opportunity to attend a forum conducted by the author of the book at a discount may also be promoted.

The promotional identification module 134 may identify bids that share a common promotional interest with one another, such as by promoting the same product. Bids prices associated with bids that share a common promotional interest with one another may be combined into a single bid price that may represent each of the bids, in certain embodiments herein. Whether bids share a common promotional interest may be determined by analyzing at least one of the targeting preferences and/or the product information associated with a bid. In one embodiment, targeting preferences may be analyzed to identify at least a portion of text in the targeting preferences that matches or overlaps search criteria entered by a user. If such a match exists, then the promotional identification module 134 may compare product information, such as a description of a product, with the same for other bids that match the user's search criteria to determine whether the bids promote the same product, in one embodiment. If the bids each promote the same product, then it may be determined that the bids share a common interest, in one embodiment.

In some embodiments, a determination of which bids may collaborate with one another based on their product promotions may be determined prior to receiving search criteria from a user. In one embodiment, the promotional identification module 134 may analyze product information associated with bids to determine whether the bids promote the same product, for example. The text accompanying the identification or description for each bid may be analyzed to determine whether it matches the text, or at least a portion of the text, associated with other bids. If a match exists, bids associated with the matching descriptions may be combined.

Various techniques may be utilized to determine whether a match exists between targeting preferences, product descriptions, or other text. Such techniques may include one or more regular expressions or other pattern matching tools or techniques.

The bid price calculation module 136 may calculate a combined bid price for bids that have been determined to share a common promotional interest, e.g., promote the same product. Various mathematical computations may be utilized to calculate the bid price. For example, a bid price may be combined using summation, in which each individual bid price is summed to arrive at a single bid price. Bid prices may be averaged in other examples. As another example, a weight function may be utilized such that certain bids may receive more or less weight or influence on bid price than other bids with which they are combined. Various other mathematical techniques may be applied in other embodiments.

A cost allocation module 138 may determine an amount of cost associated with each bid for which a combined bid was submitted. The cost may be allocated across bidding entities associated with the combined bids using various techniques. In one example, the cost allocation may be proportional to the bid amount for each bidding entity. Thus, a bidding entity that bids an amount that is two-thirds the total bid amount, for example, may be allocated a cost of two-thirds the cost associated with winning an auction for ad space. In another example, a weight function may be utilized to assign more or less of the cost to one or more bidding entities based on various considerations, such as prior bid amounts submitted by the bidding entity. For example, cost may be allocated based on a historical average of bid prices for bidding entities, or historical costs allocated to a bidding entity. Allocations based on historical averages or behavior may facilitate a more steady cost allocation and may, for example, reduce the impact of bids placed by a bidding entity that are substantially higher or lower than traditionally submitted. Numerous other examples and/or considerations to determine cost allocation may exist in other embodiments.

The one or more third party devices 140 may submit bids to the ad exchange device 110. In conjunction with submitting bids to the ad exchange device 110, the identity of a bidding entity may be received by the exchange device 110. The identity may be utilized to associate the bidding entity with a bid received from the third party device associated with the bidding entity. The third party devices 140 may be associated with various types of entities, such as sellers, brand owners, publishers, store managers, originators or creators of products or services, or numerous other entities that may or may not share a common promotional interest with other entities, such as may be exhibited by the entities promoting a certain product or service.

One or more third party modules 154 may facilitate the submission for a third party device 140. For example, a third party module 154 may include an API or other communication program module that may configure a third party device to submit information to the ad exchange device 110, in one embodiment. The third party module 154 may further ensure that information required for submitting a bid is provided, such as a bid price, targeting preferences, and an identification and/or description of a product that the third party device 140 submitting the bid is promoting. In one embodiment, the ad exchange device 110, e.g., via the auction module 130, may verify the necessary information to participate in an auction has been provided.

In addition to bid information, a third party module 154 may also send ads to the ad exchange device 110. In one embodiment, the ad exchange device 110 may present such ads in the event that a third party bidding device wins an auction. In other embodiments, the third party module 154 may provide a URL or other reference that may indicate a location, e.g., the storage 146, at which an ad may be identified and presented in ad space in association with a third party bidding device winning a bid for the ad space.

A third party module 154 may also include a web browser application or a dedicated application that may enable a user utilizing a third party device 140 to specify rules and/or preferences for participating in an auction. As described above, such rules may govern whether, or under which circumstances, a bid associated with the third party device 140 may be combined with other bids.

Various user devices, such as a laptop or smart phone, may be utilized by users 102 to communicate with an ad exchange device 110, as well as other devices. The user device 170 may include a memory 174 that may include one or more user applications 176, such as a web browser or a dedicated application. The web browser or dedicated application may output a web page 180, for example, on the display 178. The web page 180 may include content 182, such as text, audio, video, multimedia, data, or other information that may be presented to a user 102. The web page 180 may further include a search box 184 into which keywords or search text may be entered to identify ads for products corresponding to the keywords or search text. The ad exchange device 110 may receive the keywords, identify ads for products matching the keywords, and perform an auction to determine which ads may be presented in an ad space 186 within the web page 180. The user device 170 may receive the results of the search, which may include an ad for presentation in the ad space 186. In one embodiment, the ad space 186 may represent the most prominent location on the web page 180 for presenting an ad.

The configurations illustrated in FIG. 1 are not meant to be limiting. The functionality described in FIG. 1, for example, may be performed by fewer or more devices. For example, the functionality provided by the user device 170 may be performed by the third party device 140, in one embodiment.

Figure 2:
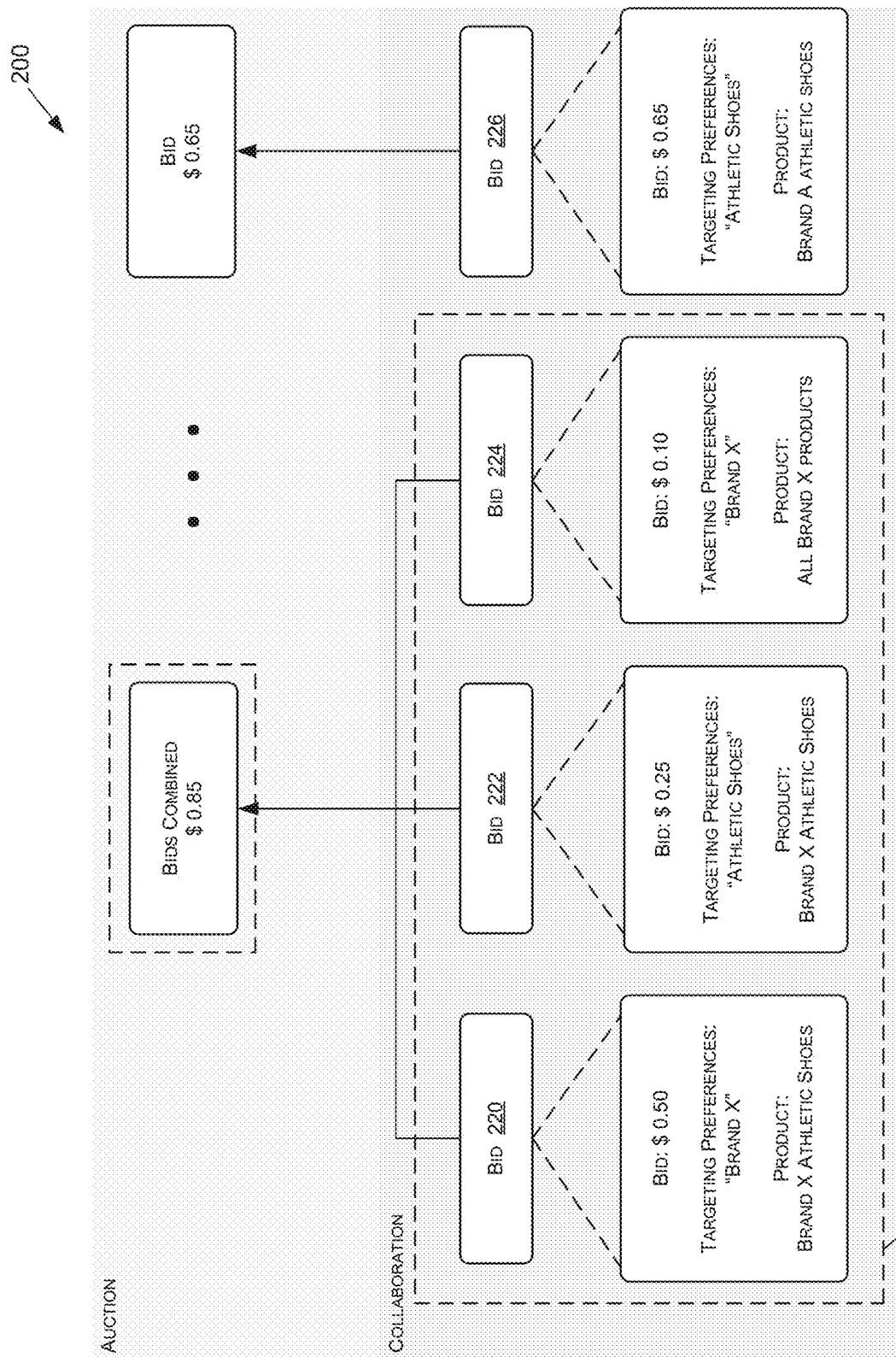
FIG. 2 illustrates a schematic diagram of an example process for combining bid prices to facilitate collaborative bidding, according to an embodiment of the disclosure.

FIG. 2 depicts a schematic diagram of an example process for combining bid prices to facilitate collaborative bidding, according to an embodiment of the disclosure. In a particular example, bids promoting a particular brand of athletic shoes (e.g., the Brand X athletic shoes) may be combined and submitted as a single bid (e.g., bid price) representing the bids. While a particular search term is illustrated in FIG. 2, many other search terms may exist in other embodiments.

In FIG. 2, an ad exchange device, similar to 110 in FIG. 1, may perform certain functions related to collaborating bids and implementing an auction to determine a winning bid, among other functions. FIG. 2 illustrates an example auction scenario 200 with at least four bids: bid 220, bid 222, bid 224, and bid 226. Each of these bids may have been submitted by a respective bidding entity. For example, bid 220 may have been submitted by a seller, bid 222 may have been submitted by a manufacturer, bid 224 may have been submitted by a brand owner, and bid 226 may have been submitted by another seller. Although four bids are shown, fewer or more may exist in other examples.

As described, information associated with each bid may be analyzed to determine whether bids have a common promotional interest, such as an interest in promoting the same product. The information associated with each bid may be identified or parsed (e.g., by the collaboration module 130) and stored in the storage 116 in FIG. 1, or another storage location accessible locally to the ad exchange device 110 or accessible via the one or more networks 105.

As shown in FIG. 2, information associated with the bid 220 indicates that the seller may be interested in submitting bid 220, for a price of $0.50, when the search term "Brand X" appears in a search, e.g., in whole or as a subset of another term. The product that the seller 220 is interested in promoting, as indicated in the product information field, is Brand X athletic shoes.

Information associated with the bid 222 indicates that the manufacturer may be interested in submitting bid 222, for a price of $0.25, when the search term "athletic shoes" appears in a search string. The product that the manufacturer is interested in promoting may also be the Brand X athletic shoes, as indicated by the product information field.

Information associated with the bid 224 indicates that the brand owner may be interested in submitting bid 224, for a price of $0.10, when the search term "Brand X" appears in a search string. The product that the manufacturer is interested in promoting may be all products associated with Brand X, as indicated by a specification of "all" in the product information field. For example, in addition to Brand X athletic shoes, the brand owner may be interested in submitting a bid on T-shirts, other clothing, accessories, etc., associated with Brand X. In addition to products, the brand owner may submit a bid for services associated with Brand X, such as athletic camps that have endorsed Brand X, or seminars at which athletes who wear Brand X shoes, clothing, etc., may attend, as non-limiting examples. In one embodiment, a specific list of products that the brand owner is interested in promoting may also be provided. When any of such products is specified in search criteria, for example, a bid may be submitted to display an ad associated with the particular product.

Information associated with the bid 226 indicates that another seller may be interested in submitting bid 226, for a price of $0.65, when the search term "athletic shoes" appears in a search string. The product that the additional seller is interested in promoting may be a particular brand of athletic shoes, such as Brand A. Because Brand X is not being promoted by the additional seller, bid 226 may not be considered collaborative with bids 220, 222, and 224, as will be described in greater detail below.

Each of the bids may also include rules information that may determine whether they may be combined with other bids and, if so, the terms of such collaborations. Such information may be stored in the storage 146 in FIG. 1, or another storage device that is accessible by the ad exchange device 110. As described, a rules user interface module 128 may be utilized by the sellers, for example, to specify certain rules regarding collaboration of bids submitted by the sellers. Some bidding entities, for example, may not desire to have their bids combined with certain other entities. As another example, some bidding entities may only want to collaborate with other bidding entities in association with bidding on the most prominent location on a web page, e.g., the web page 180 in FIG. 1. Numerous other rules may exist for each bidding entity in association with bids submitted by the bidding entity, in other examples. For purposes of illustration, it is assumed that no rules have been implemented to restrict the combination of bids in the present example.

As mentioned above, the auction scenario 200 may be implemented by an ad exchange device, such as the ad exchange device 110 in FIG. 1. The ad exchange device 110 may have received the bids 220, 222, 224, and 226, including the bid price, targeting preferences, and product information for each of the bids. The ad exchange device 110 may include functionality to implement collaboration of bids (e.g., via the collaboration modules 132) and an auction (e.g., via the auction module 130), among other functions.

Collaboration of bids may be determined based on various information. For example, in one embodiment, product information associated with bids may be analyzed to determine whether the bids are directed to the same product. Bids 220 and 222, for example, both indicate an interest in promoting the "Brand X athletic shoes" product, as shown in FIG. 2. Further, bid 224 is directed to any products associated with Brand X, and therefore, may be considered to promote the Brand X athletic shoes. Bid 226, however, may not promote Brand X products, but may instead promote products associated with brand Brand A, which may be a brand that competes with Brand X. Thus, based on product information associated with the bids shown in FIG. 2, bids 220, 222, and 224 may be combined with one another (because each of them are promoting the Brand X athletic shoes) (as illustrated by dotted line 215), while bid 226 may not be combined with these bids because bid 226 is promoting different brands of athletic shoes. Thus, a single bid price of $0.85 (e.g., $0.50+$0.25+$0.10) may be submitted in an auction for the combination of bid prices for bids 220, 222, and 224, respectively. In one embodiment, the combination of bids based on product information may be performed independent of a search term entered by a user, for example, which may trigger an auction to determine an ad for displaying products identified by the search term.

According to another example, bids may be collaborated based on search terms that may be received by the ad exchange device 200 from a user utilizing a user device, such as the user device 170 in FIG. 1. In the present example, the search term "Brand X athletic shoes" may be received. The ad exchange device 110, e.g., via the promotional identification module 134, may determine whether at least a portion of the targeting preferences associated with the bids 220, 222, 224, and 226 match the search term. A match may indicate that a bidding entity submitting the bid desires to participate in an auction for an opportunity to present an ad to the user who is searching for "Brand X athletic shoes." Pattern matching using regular expressions or other techniques may be utilized to determine whether a match exists, in certain embodiments.

In the present example, targeting preferences for each of the bids 220, 222, 224, and 226 contains overlapping text with the search term, e.g., "Brand X" (as indicated in bids 220 and 224) matches a portion of "Brand X athletic shoes," and "athletic shoes" (as indicated in bids 222 and 226) matches a portion of "Brand X athletic shoes." Thus, each of the bids in FIG. 2 may be submitted in an auction in response to a user entering the specified search term. Other bids (not shown) that do not include at least a portion of the "Brand X athletic shoes" search term in their targeting preferences may not be included in the auction.

After identifying bids whose targeting preferences are associated with the user's search term, bids may be further analyzed to determine whether they are promoting the same product, according to one embodiment. For example, bids 220 and 222 both indicate that they promote Brand X athletic shoes. Therefore, the bids 220 and 222 may be combined to create a total bid price of $0.75 (e.g., $0.50+$0.25). Further, bid 224, which promotes all Brand X products, including Brand X athletic shoes, may also be combined with bids 220 and 222 to create a total bid price of $0.85 (e.g., $0.50+$0.25+$0.10). In this example, bid 224 may include a product listing for "Brand X athletic shoes," which may be determined to match the same product listing associated with bids 220 and 222. Bid 226, however, which promotes a product other than Brand X, may not be combined with bids 220, 222, and 224, but may be submitted in an auction as a competing bid against the combined $0.85 bid price for the bids 220, 222, and 224.

In some embodiments, promotional interests as identified by bid information may be analyzed to determine whether sufficient overlap in promotional interest exists. In the present example, such interest may be clear because bid 220 and 222 indicate an interest in the same product, while bid 226 indicates an interest in all products for a particular brand, which may also clearly indicate an interest in promoting the Brand X athletic shoes. In a further example, a manufacturer of shoe laces may submit a bid (not shown) when a user's search term includes the search term "athletic shoes." The shoe lace manufacturer's product description, however, may indicate a particular model of its shoe laces instead of the Brand X athletic shoe. In one embodiment, the shoe lace manufacturer's bid may not be combined with the bids associated with the Brand X athletic shoes because the shoe laces do not match the "Brand X athletic shoes" product listing associated with bids 220, 222, and 224, in the present example.

In other embodiments, however, the ad exchange device 200, e.g., via the collaboration module 132, may determine whether an association exists between the shoe laces and the Brand X athletic shoes. If such an association exists, the shoe laces bid may be combined with the combined bid for the Brand X athletic shoes. Various criteria may be analyzed to determine whether an association exists. For example, product specifications for the Brand X athletic shoes may indicate that the shoe lace manufacturer's laces are used in the Brand X athletic shoes. Other information that may indicate that the shoe laces are a component, a subset, or otherwise associated with the Brand X athletic shoes may also be analyzed to draw an association between the Brand X athletic shoes and the shoe laces. Barring any rules to the contrary, a bid for the shoe laces manufacturer may be combined with the combined bid for the Brand X athletic shoes if an association between the two products is determined, according to one embodiment.

An auction may be performed, e.g., by the auction module 130 in FIG. 1, to determine a winning bid. In the present example, excluding the shoe laces bid, the combined bid price of $0.85 representing the summation of bid prices for bids 220, 222, and 224 may be compared to the $0.65 bid price associated with bid 226. The bid price of $0.85, being the highest bid price, may be identified as the winning bid, in one embodiment. Thus, by virtue of combining bids 220, 222, and 224, neither of which alone is greater than the $0.65 bid price associated with bid 226, collaborative bidding may be enabled for the seller, the manufacturer, and the brand owner associated with bids 220, 222, and 224, respectively, to facilitate displaying a product ad in ad space viewed by the user who entered the search for the Brand X athletic shoes. Although summation is used to combine bid prices in the above examples, other examples may use other mathematical operations, such as an average, weighted average, etc., to determine a combined bid price.

In some embodiments, collaboration may also be implemented for bids associated with various services. One use case example of combining bids that promote the same service may include combining bids directed towards the same political campaign. For example, bids submitted by bidding entities that support a particular political candidate may be combined based on their shared interest in electing the same political candidate. Such bids may include an identification or description of the candidate in the product information portion of the bid. Upon identifying matching product or service information among the bids, bid prices associated with the bids may be combined. Such combination may be according to one or more rules in the same or similar fashion to that described above for combining bids that promote the same product. The combined bid price supporting the same political candidate may be submitted in an auction for ad space, where it may compete against other bids, such as bids that promote one or more different political candidates. Upon winning the ad space, one or more ads associated with the political candidate may be displayed in the ad space, in the same or similar fashion to that described above.

The above examples are not meant to be limiting. Numerous other examples and configurations may exist in other embodiments to facilitate implementation of collaborative bidding. For example, bids associated with different products or services may be combined in other examples. Additionally, different search terms, product information, target preferences, etc., may exist in other examples. In yet other examples, collaborative bidding entities may be determined based on considerations other than, or in addition to, keyword searches or comparisons of information identifying which products are promoted by a bidding entity or a bid.

Figure 3:
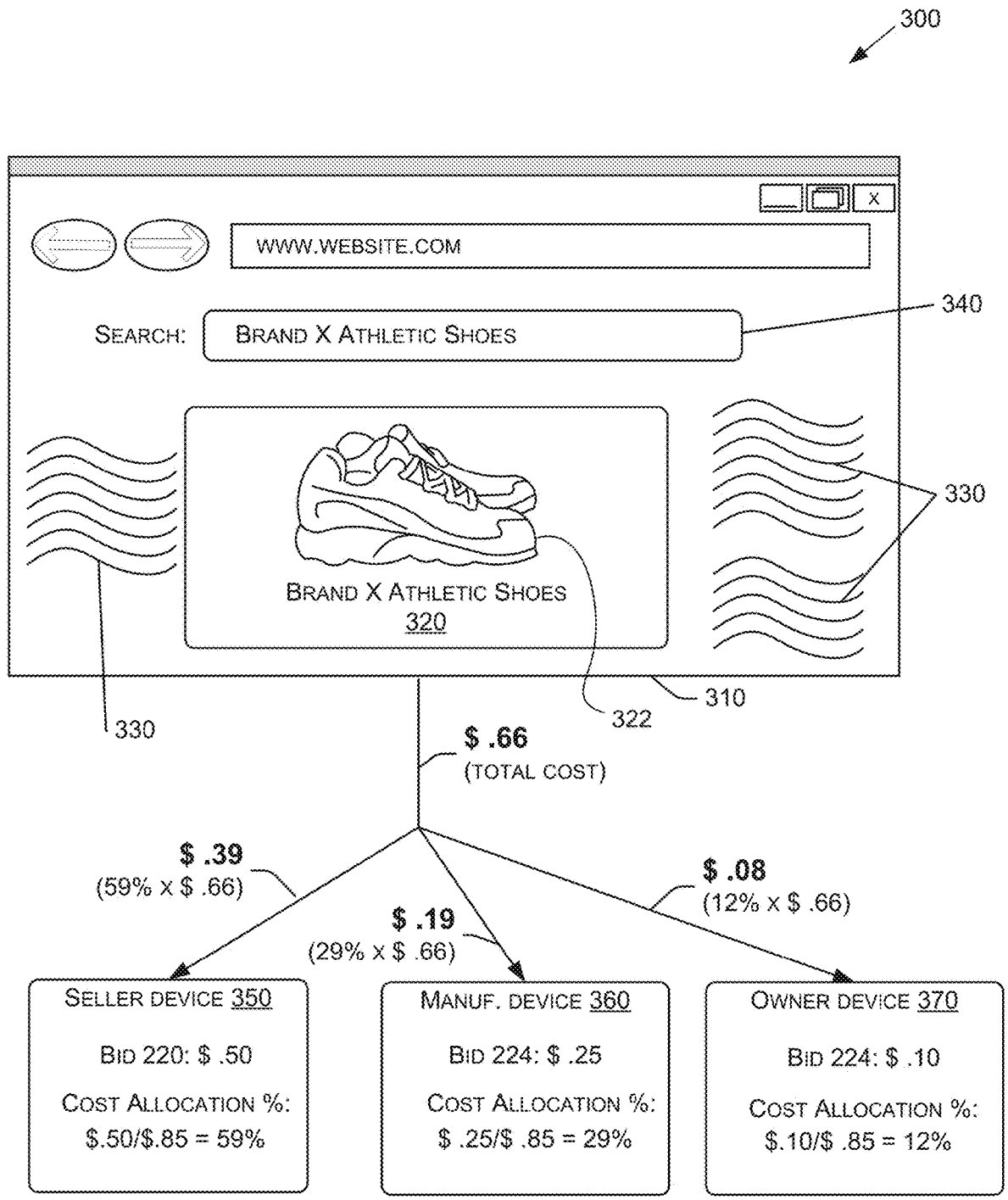
FIG. 3 illustrates a diagram for allocating costs among collaborative bidding entities, according to an embodiment of the disclosure.

FIG. 3 depicts a scenario for allocating cost among collaborative bidding entities in response to winning an auction bid for ad space, according to an embodiment of the disclosure. Costs associated with submitting a winning bid in an auction may be allocated among the bidding entities that were determined to promote the same product, in one embodiment. For example, with reference to the bids illustrated in FIG. 2, the bid 220 submitted by the seller, bid 222 submitted by the manufacturer, and bid 224 submitted by the brand owner may have been combined for a collaborative bid to display, on a web page 310, an ad in a particular ad space, such as 320. In one embodiment, a seller device 350, a manufacturer device 360, and a brand owner device 370 may be associated with the bids 220, 222, and 224, respectively. Each of the devices 350, 360, 370 may be third party devices, e.g., third party devices 140 illustrated in FIG. 1.

As shown in FIG. 3, a Brand X athletic shoes ad 322 may be displayed in ad space 320, which may represent a relatively prominent location on web page 310, and which may include content 330 and a search entry box 340 for receiving search criteria. In some embodiments, the ad 322 may be displayed at other, e.g., less prominent, locations on the web page 310, such as a portion of the web page 310 that may be viewed upon scrolling the web page down. In some embodiments, different ads may be associated with each bidding entity for which collaborative bidding was performed to submit a winning bid. While each ad may refer to the same product description (e.g., "Brand X athletic shoes"), the ads may be different in the way that the content, or the information about the ad, may vary. For example, an ad generated by the seller device 350 may provide an image of Brand X athletic shoes with the Brand X logo in relatively large, visible form. An ad generated by the brand owner device 360, however, may provide an image of the Brand X athletic shoes with a less prominent logo, but may also have relatively large, visible text stating "Brand X athletic shoes." Numerous other examples of ads may exist in other embodiments.

A determination of which ad to display in the ad space 322 may be performed by the ad exchange device 110 in FIG. 1, e.g., via the collaboration module 132. Such a determination may facilitate a selection of one or more ads associated with the bids 220, 222, and 224 in FIG. 2. According to one example, if each of the ads associated with the Brand X athletic shoes product is identical, then the identical ad may be shown in the ad space 320. In other examples, multiple ads (e.g., an ad for each of the bidding entities for which a bid was combined) may be shown. In another example, an ad associated with a bid that is currently winning an auction in the process for ad space 320 may be displayed in the ad space 320 in the event that other bids are combined with the bid to win the ad space. Thus, according to this example, bids may be joined after an auction has begun. A rule may exist for a bidding entity that instructs the ad exchange device, e.g., the collaboration module 132, to identify ads having a similar promotional interest if an ad associated with the bidding entity is no longer winning the most prominent location on a web page, if the bidding entity desires to collaborate with a bidding entity that is currently winning the most prominent location and with which it shares promotional interests, or whether no requirement exists regarding the most prominent location on a web page (e.g., the bidding entity desires to combine with other bidding entities irrespective of which entity is currently winning the most prominent location). Other rules regarding rules for collaborative bidding for bidding entities may exist in other embodiments.

In a further example, when bidding entities have different ads for the same product, at least one of the ads associated with combined bidding entities may be displayed in the ad space 320 (e.g., the most prominent location on the web page 310), while the other ads may be displayed in a less prominent location, e.g., underneath the ad space 320 accessible by a user via interacting with a scroll bar. A determination of which ad is displayed in the ad space 320 may be based on a bid price associated with a bidding entity (e.g., the highest bidder may display its ad in the ad space 320), a relationship between bidding entities, or other criteria.

As described, costs associated with winning a bid for the ad space 320 may be allocated among the seller device 350, the manufacturer device 360, and the brand owner device 370, collaboration for each of which was provided to enable the devices to win an auction for the ad space 320. In the example described in FIG. 2, these bidding entities submitted a combined, winning bid of $0.85. Costs for the ad space 320 may vary. One embodiment may involve a second price auction, in which the winning bidding entity may be charged the price of the second place bid, e.g., $0.65 submitted by the seller who submitted bid 226 in FIG. 2, plus an additional $0.01 to yield $0.66. In some embodiments, factors in addition to, or alternative to, the second place bid price may be used to determine the price charged to the winning bidding entity. Such factors may include, but are not limited to, an expected click-through rate (CTR), which may indicate an expected number of clicks that an ad may receive, and hidden price floors, which may establish a minimum acceptable bid price.

In one embodiment, the amount of cost allocated to a bidding entity may be proportionate to the bid price submitted by each entity. For example, the seller submitted a bid price of $0.50 with bid 220, which is about 59% of the combined bid price of $0.85. The manufacturer submitted a bid price of $0.25 with bid 222, which is about 29% of the combined bid price of $0.85. The brand owner submitted a bid price of $0.10 with bid 224, which is about 12% of the combined bid price of $0.85. Thus, in one embodiment, costs may be allocated according to the 59%, 29%, and 12% bid price contributions associated with the seller, the manufacturer, and the brand owner, respectively. Applying such percentages according to second price auction costs may yield a cost allocation of about $0.39 for the seller (e.g., 59%*$0.66), about $0.19 for the manufacturer (e.g., 29%*$0.66), and about $0.08 for the brand owner (e.g., 12%*$0.66). In this way, bidding entities who share a common interest, e.g., in promoting the same product, may share the expense associated with advertising to promote the interest or product.

Different mathematical calculations, techniques, or approaches in addition to that described above may be used in other embodiments to allocate cost amongst collaborative bidding entities. For example, in one embodiment, a bidding entity that submitted the highest bid before collaboration may be charged the entire cost. Thus, in the present example, the seller who submitted bid 220 may be charged the entire cost of $0.66, while the other bidding entities may not be allocated a cost. In other embodiments, costs may be shared equally, based on a weighted average that considers a number of factors, including historical bid prices, costs, etc., or based on various statistical analysis techniques, as non-limiting examples.

The above description in FIG. 3 is not meant to be limiting. Other embodiments, for example, may not include a second price auction but may instead include an auction that determines cost differently. Other embodiments may also include information resources other than a web page, different numbers and types of bidding entities, etc.

Figure 4:
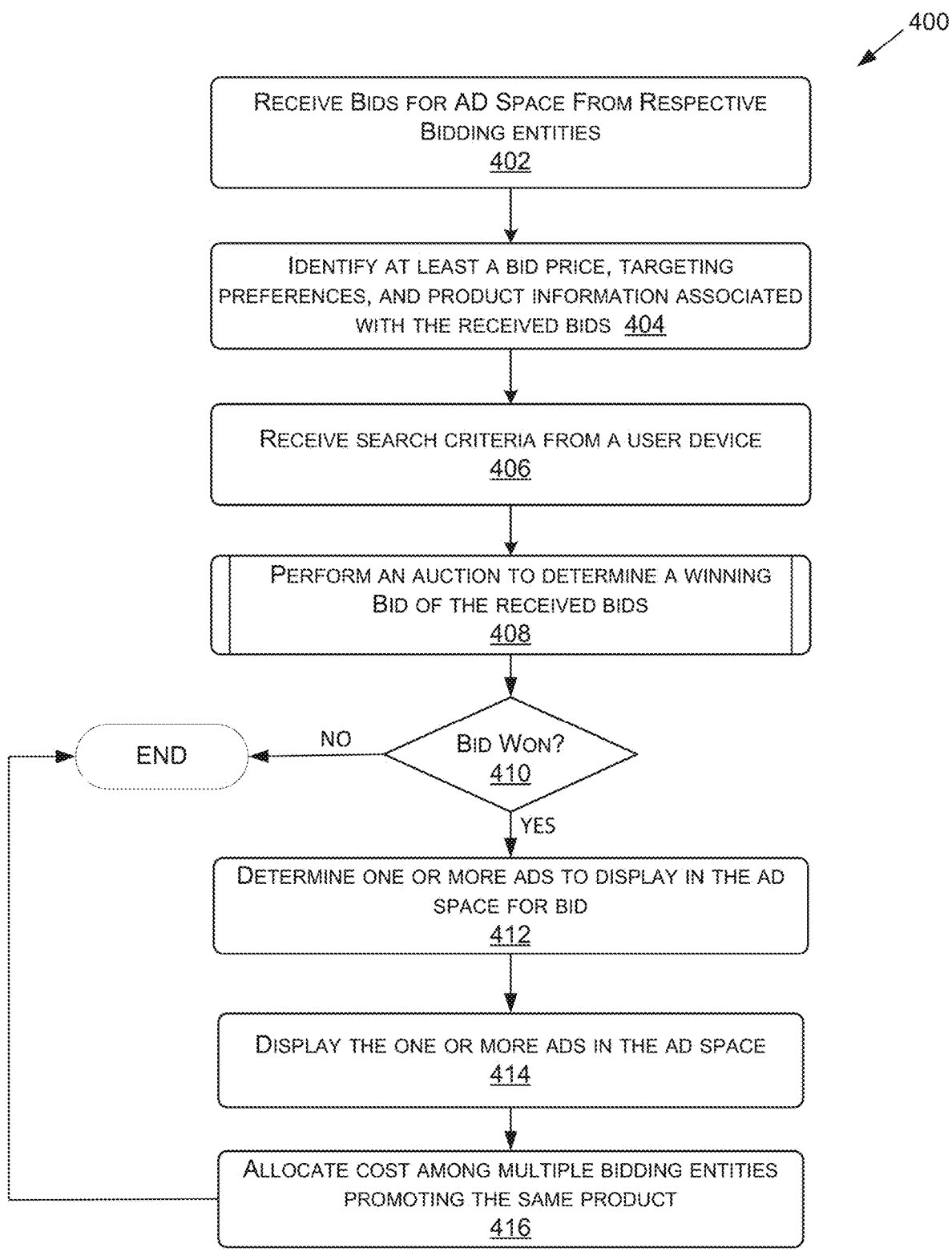
FIG. 4 illustrates a flow diagram of an example process for implementing collaborative bidding, according to an embodiment of the disclosure.

FIG. 4 depicts a flow diagram of an example process for implementing collaborative bidding, according to an embodiment of the disclosure. In one embodiment, collaborative bidding may be performed by an ad exchange device 110. The example flow diagram may begin at block 402, where bids may be received from one or more bidding entities. Example bidding entities may include, but are not limited to, sellers, manufacturers, brand owners, publishers, or other entities or individuals who may be interested in promoting a product or service. A bidding entity may be associated with a device, such as a third party device 140 in FIG. 1, which may be utilized to send bids to an ad exchange device, among other functions.

At block 404, at least a bid price, one or more targeting preferences, and product information may be identified in each of the received bids. The targeting preferences may indicate an instance in which a bid associated with an ad should be submitted. For example, certain keywords or search terms entered by a user may trigger submission of a bid, based on the search terms matching the targeting preferences. Such search terms may be received from a user operating a user device, such as 170, at block 406.

Figure 5:
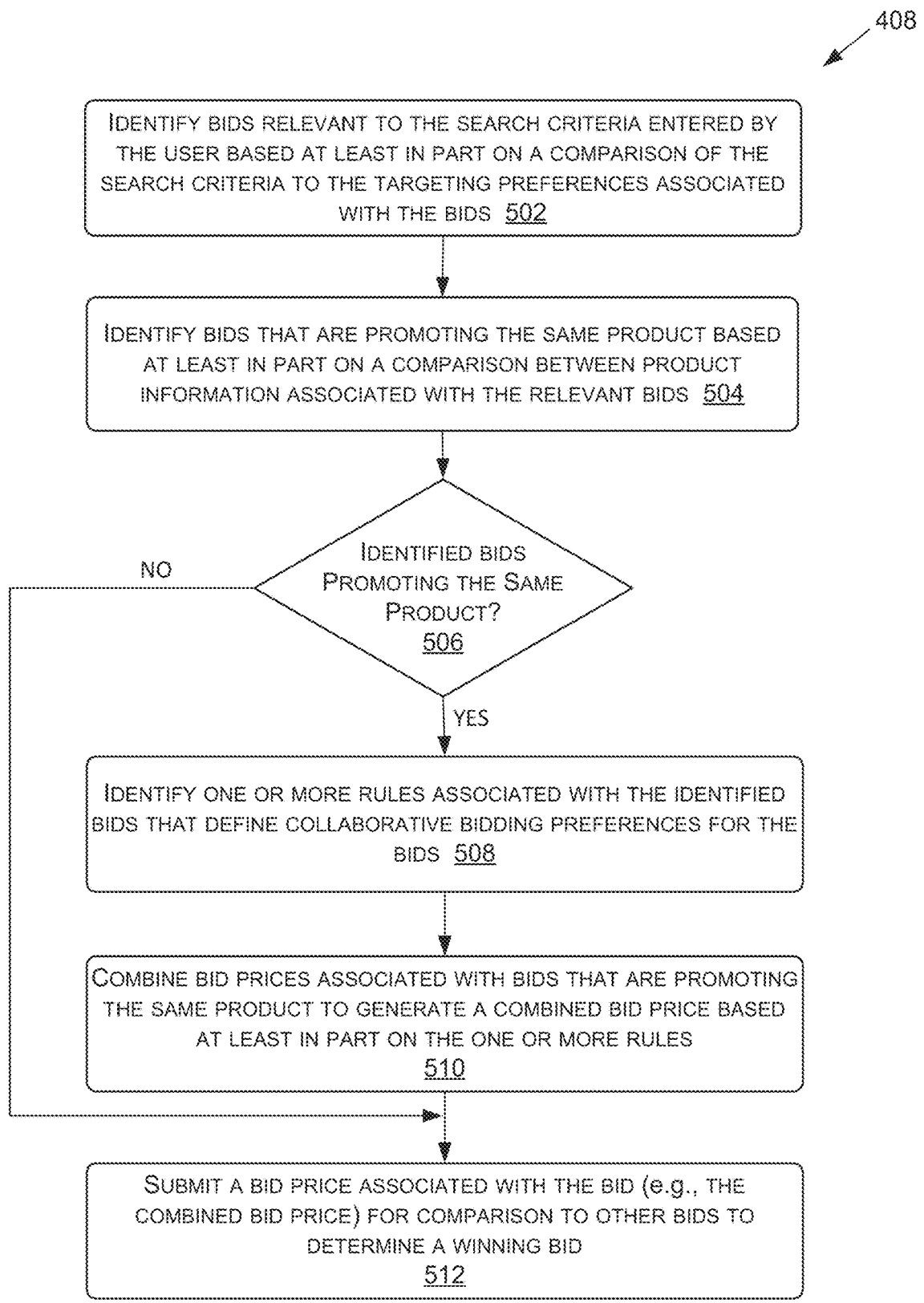
FIG. 5 illustrates a flow diagram of an example process for sharing bid prices and costs among multiple bidding entities, according to an embodiment of the disclosure.

At block 408, an auction may be performed to determine a winning bid of the received bids. Turning to FIG. 5, a flow diagram of an example process 500 for combining bids that promote the same product is illustrated, according to an embodiment of the disclosure. The process 500 may begin at block 502, where bids relevant to the search criteria entered by a user (e.g., at block 406) may be identified based on a comparison of the search criteria and the targeting preferences associated with the bids. A match between such search criteria and targeting preferences associated with a bid may indicate that the bid is relevant and therefore may be included in an auction to determine the winning bid. Bids that have targeting preferences that do not match the search criteria may be considered irrelevant (e.g., because they are not targeted to the user's preferences or search criteria), and therefore, such bids may not be included in the auction. As described above, a match may be determined by regular expressions or other pattern matching techniques in which, for example, a match may be determined to exist if targeting preferences are identified in at least a portion of the search criteria, or vice versa.

At block 504, bids that are promoting the same product may be identified. Such bids may be combined with one another to compete against other bids promoting different products, in one embodiment. In one embodiment, bids may be combined based on a comparison of product information associated with the bids. Such product information may include a description and/or content (e.g., an ad) associated with the product. A match between such product information among bids may indicate that the bids are promoting the same product.

If it is determined that bids are promoting the same product, at block 506, then collaboration rules or preferences associated with the bids may be analyzed to determine whether, or under which circumstances, bids may be combined with other bids, at block 508. Bids may be combined according to such rules or preferences, in one embodiment. Bids that are determined to promote the same product may be combined such that a single bid price associated with the bids may be generated, at block 510. Various mathematical operations and/or techniques may be utilized to combine bid prices, such as addition, averaging, weighted averaging, etc. The combined bids may be submitted for comparison to other bids in an auction to determine a winning bid, in one embodiment, at block 512.

If it is determined that multiple bids are not promoting the same product, or collaboration rules prohibit the collaboration of bids, then processing may proceed to block 512, where individual bids may be submitted in an auction to determine a winning bid.

Returning to FIG. 4, a determination may be made as to whether the auction was won by the combined bid, at block 410. If the auction was not won, processing may end, in one embodiment. If the auction was won, one or more ads to display in the ad space may be determined, at block 412. According to certain embodiments herein, the ad space in which the ad may be displayed may be the most prominent location on a web page or other information resource, for example. Various approaches may be used to determine which ad to present, for example, when combined bids each have different ads (e.g., content identified in the product information associated with the ad) but have the same description of the product. For example, if a bid was currently winning the ad space prior to being collaborated with other bids, then an ad associated with the bid that was winning the ad space may be shown in the ad space. Multiple ads, e.g., one associated with each bid that was combined, may be presented in the ad space, in some embodiments. The one or more ads selected for display may be shown in the ad space, at block 414.

Cost may be allocated among the multiple bidding entities promoting the same product, at block 416. Various cost allocation techniques may be used, such as allocating costs proportional to the bid price submitted by each bidding entity, allocating an entire portion of the cost to a particular bidding entity, e.g., the bidding entity that submitted the highest bid price, allocating the cost evenly across each of the collaborating bidding entities, etc.

Figure 6:
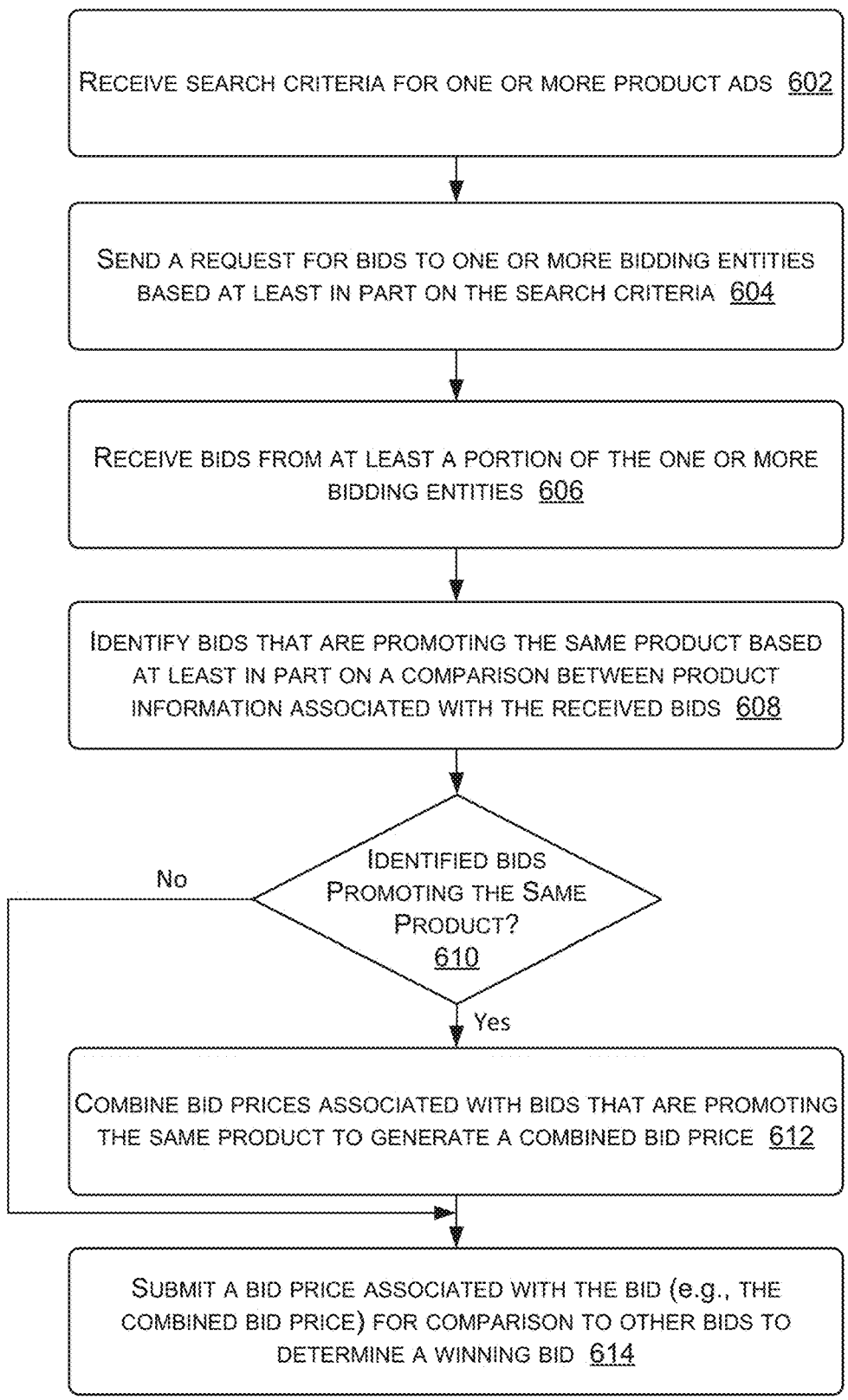
FIG. 6 illustrates a flow diagram of an example process for implementing collaborative bidding in real time, according to an embodiment of the disclosure.

FIG. 6 depicts a flow diagram of an example process 600 for implementing collaborative bidding in real time, according to an embodiment of the disclosure. Real-time collaborative bidding may include requesting bids from one or more bidding entities based on receiving a user's request to display product ads. The example process may begin at block 602, where search criteria for one or more product ads may be received from a user device. At block 604, a request for bids may be sent to one or more bidding entities, such as ad exchanges or bidding entity devices (e.g., the third party devices 140) based on the search criteria received from the user device. In one embodiment, the search criteria may be included in a request for a bid to, for example, inform a bidding entity about which products or services in which a user is interested.

Certain bidding entities may be identified for receiving a bid request based on the search criteria, in one embodiment. As a non-limiting example, bidding entities that have previously submitted bids to display ads for certain products may be targeted for receiving bid requests when search criteria indicates that such products are desired by a user.

Bids from at least a portion of the bidding entities that received a request for bids may be received, at block 606. As described above, the bids received from the bidding entities may include a bid price, one or more targeting preferences, and product information. Bids that are promoting the same product may be identified by comparing product information among the received bids, in one embodiment, at block 608. A match between such product information may indicate bids that are promoting the same product. If multiple bids are promoting the same product, at block 610, bid prices associated with these bids may be combined to generate a combined bid price, at block 612. The combined bid price may be submitted for comparison, e.g., in an online auction, to determine a winning bid, at block 614. If multiple bids entities are determined to promote different products, at block 610, then each individual received bid may be submitted in an auction to determine a winning bid, at block 614.

While not shown in FIG. 6, certain embodiments associated with a real-time implementation of collaborative bidding may include identifying one or more rules associated with bids that are promoting the same product and analyzing the rules to determine whether, or according to which circumstances or conditions, such bids may be combined.

In some embodiments, all or a portion of the functionality described herein may be performed by one or more software programs and/or modules. For example, software, such as an operating system or software application, may configure itself without communicating with a configuration agent as described above.

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   generating, by one or more computer processors coupled to at least one memory, a bid request for a content delivery slot;
   sending the bid request to a first computing device, a second computing device, and a third computing device;
   receiving a first bid request response from the first computing device, the first bid request response comprising a first bid amount and a first targeting criteria;
   receiving a second bid request response from the second computing device, the second bid request response comprising a second bid amount, and a second targeting criteria;
   receiving a third bid request response from the third computing device, the third bid request response comprising a third bid amount and a third targeting criteria;
   determining, using a first rule of a set of rules, that the first targeting criteria at least partially matches the second targeting criteria;
   determining, using a second rule of a set of rules, that the second targeting criteria at least partially matches the third targeting criteria, wherein the second rule is different from the first rule;
   determining search criteria comprising one or more keywords from a user device;
   determining that the one or more keywords satisfy the first targeting criteria;
   determining that the one or more keywords satisfy the second targeting criteria;
   determining that the first bid request response, the second bid request response, and the third bid request response each comprise a same product identifier;
   determining a combined bid amount using a first bid amount of the first bid request response, a second bid amount of the second bid request response, and a third bid amount of the third bid response request; and
   determining a winning bid amount for the content delivery slot, wherein the winning bid amount is the combined bid amount.

2. The method of claim 1, further comprising:
   selecting content associated with the first bid request response and the second bid request response; and
   causing presentation of the content at the user device.

3. The method of claim 1, further comprising:
   determining that the first bid request response and the second bid request response comprise a same product identifier.

4. The method of claim 1, further comprising:
   generating, at the content delivery slot, scrolling functionality;
   wherein content is accessible in response to a scrolling input at the content delivery slot.

5. The method of claim 1, further comprising:
   determining a first segment and a second segment of the content delivery slot;
   determining that the first bid amount is greater than the second bid amount;
   determining that the first segment is larger than the second segment; and
   causing first content associated with the first bid request response to be presented at the first segment, and second content associated with the second bid request response to be presented at the second segment.

6. The method of claim 1, further comprising:
   determining a first segment and a second segment of the content delivery slot;
   determining that the first bid amount is greater than the second bid amount;
   determining that the first segment is larger than the second segment; and
   causing first content associated with the first bid request response and second content associated with the second bid request response to be presented at the first segment.

7. The method of claim 1, wherein determining the combined bid amount using the first bid amount of the first bid request response and the second bid amount of the second bid request response comprises:
   determining a sum, an average, or a weighted average of the first bid amount and the second bid amount.

8. A device comprising:
   at least one memory that stores computer-executable instructions;
   at least one processor configured to access the at least one memory and execute the computer-executable instructions to:
     generate a bid request for a content delivery slot;
     send the bid request to a first computing device, a second computing device, and a third computing device;
     receive a first bid request response from the first computing device, the first bid request response comprising a first bid amount and a first targeting criteria;
     receive a second bid request response from the second computing device, the second bid request response comprising a second bid amount, and a second targeting criteria;
     receive a third bid request response from the third computing device, the third bid request response comprising a third bid amount and a third targeting criteria;

determine, using a first rule of a set of rules, that the first targeting criteria at least partially matches the second targeting criteria;

determine, using a second rule of a set of rules, that the second targeting criteria at least partially matches the third targeting criteria, wherein the second rule is different from the first rule;

determine search criteria comprising one or more keywords from a user device;

determine that the one or more keywords satisfy the first targeting criteria;

determine that the one or more keywords satisfy the second targeting criteria;

determine that the first bid request response, the second bid request response, and the third bid request response each comprise a same product identifier;

determine a combined bid amount using a first bid amount of the first bid request response, a second bid amount of the second bid request response, and a third bid amount of the third bid response request; and determine a winning bid amount for the content delivery slot, wherein the winning bid amount is the combined bid amount.

9. The device of claim 8, wherein the at least one processor is further configured to access the at least one memory and execute the computer-executable instructions to:

select content associated with the first bid request response and the second bid request response; and cause presentation of the content at the user device.

10. The device of claim 8, wherein the at least one processor is further configured to access the at least one memory and execute the computer-executable instructions to:

determine that the first bid request response and the second bid request response comprise a same product identifier.

11. The device of claim 8, wherein the at least one processor is further configured to access the at least one memory and execute the computer-executable instructions to:

generate, at the content delivery slot, scrolling functionality;

wherein content is accessible in response to a scrolling input at the content delivery slot.

12. The device of claim 8, wherein the at least one processor is further configured to access the at least one memory and execute the computer-executable instructions to:

determine a first segment and a second segment of the content delivery slot;

determine that the first bid amount is greater than the second bid amount;

determine that the first segment is larger than the second segment; and cause first content associated with the first bid request response to be presented at the first segment, and second content associated with the second bid request response to be presented at the second segment.

13. The device of claim 8, wherein the at least one processor is further configured to access the at least one memory and execute the computer-executable instructions to:

determine a first segment and a second segment of the content delivery slot;

determine that the first bid amount is greater than the second bid amount;

determine that the first segment is larger than the second segment; and cause first content associated with the first bid request response and second content associated with the second bid request response to be presented at the first segment.

14. The device of claim 8, wherein determining the combined bid amount using the first bid amount of the first bid request response and the second bid amount of the second bid request response comprises:

determining a sum, an average, or a weighted average of the first bid amount and the second bid amount.

15. One or more non-transitory computer-readable medium comprising computer-executable instructions that, when executed by at least one processor, execute a method comprising:

generating, by one or more computer processors coupled to at least one memory, a bid request for a content delivery slot;

sending the bid request to a first computing device, a second computing device, and a third computing device;

receiving a first bid request response from the first computing device, the first bid request response comprising a first bid amount and a first targeting criteria;

receiving a second bid request response from the second computing device, the second bid request response comprising a second bid amount, and a second targeting criteria;

receiving a third bid request response from the third computing device, the third bid request response comprising a third bid amount and a third targeting criteria;

determining, using a first rule of a set of rules, that the first targeting criteria at least partially matches the second targeting criteria;

determining, using a second rule of a set of rules, that the second targeting criteria at least partially matches the third targeting criteria, wherein the second rule is different from the first rule;

determining search criteria comprising one or more keywords from a user device;

determining that the one or more keywords satisfy the first targeting criteria;

determining that the one or more keywords satisfy the second targeting criteria;

determining that the first bid request response, the second bid request response, and the third bid request response each comprise a same product identifier;

determining a combined bid amount using a first bid amount of the first bid request response, a second bid amount of the second bid request response, and a third bid amount of the third bid response request; and determining a winning bid amount for the content delivery slot, wherein the winning bid amount is the combined bid amount.

16. The one or more non-transitory computer-readable medium of claim 15, wherein the method further comprises:

selecting content associated with the first bid request response and the second bid request response; and causing presentation of the content at the user device.

17. The one or more non-transitory computer-readable medium of claim 15, wherein the method further comprises:

determining that the first bid request response and the second bid request response comprise a same product identifier.

18. The one or more non-transitory computer-readable medium of claim 15, wherein the method further comprises:
  generating, at the content delivery slot, scrolling functionality;
  wherein content is accessible in response to a scrolling input at the content delivery slot.

19. The one or more non-transitory computer-readable medium of claim 15, wherein the method further comprises:
  determining a first segment and a second segment of the content delivery slot;
  determining that the first bid amount is greater than the second bid amount;
  determining that the first segment is larger than the second segment; and
  causing first content associated with the first bid request response to be presented at the first segment, and second content associated with the second bid request response to be presented at the second segment.

20. The one or more non-transitory computer-readable medium of claim 15, wherein the method further comprises:
  determining a first segment and a second segment of the content delivery slot;
  determining that the first bid amount is greater than the second bid amount;
  determining that the first segment is larger than the second segment; and
  causing first content associated with the first bid request response and second content associated with the second bid request response to be presented at the first segment.

\* \* \* \* \*